April 7, 1953     A. R. GEISZLER ET AL     2,634,353
CURRENT CONTROL FOR TRAVEL HEAD STRIP SEAM WELDERS
Filed Aug. 2, 1951     2 SHEETS—SHEET 1

Inventors
ALBERT R. GEISZLER
LEROY R. CONKLIN
By Francis J. Klempay
Attorney

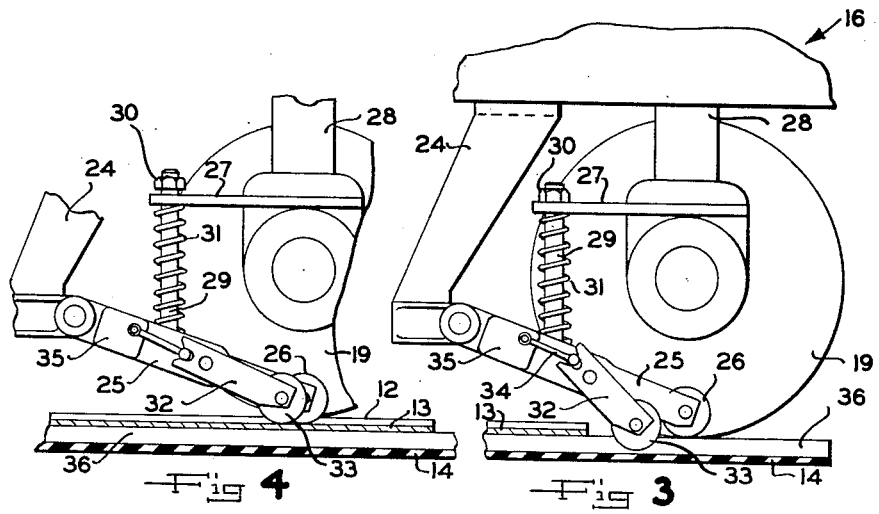
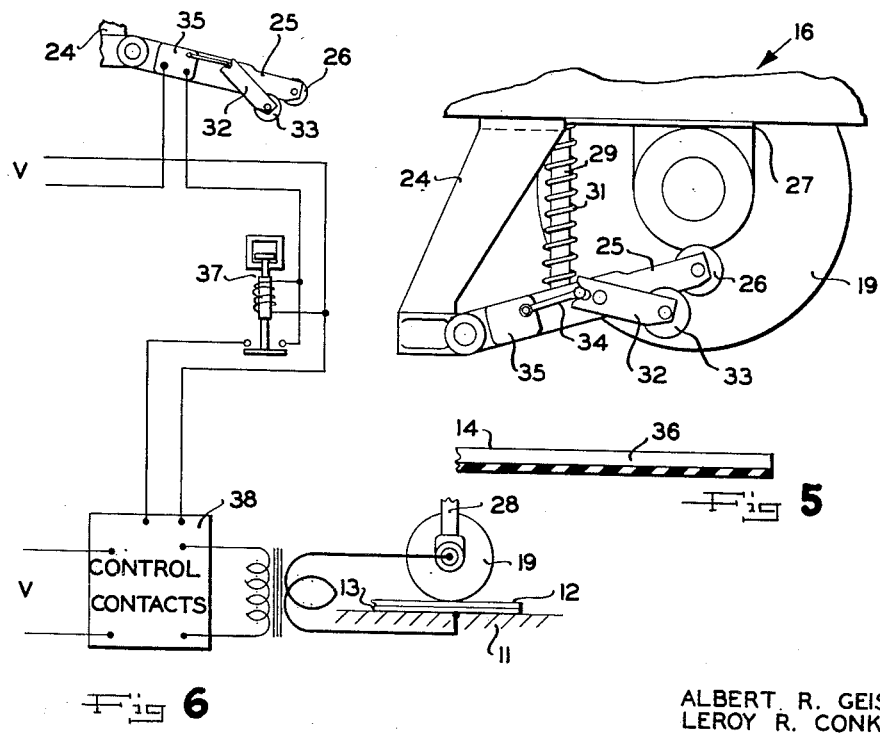

Patented Apr. 7, 1953

2,634,353

UNITED STATES PATENT OFFICE 2,634,353

CURRENT CONTROL FOR TRAVEL HEAD STRIP SEAM WELDERS

Albert R. Geiszler and Leroy R. Conklin, Warren, Ohio, assignors to The Taylor-Winfield Corporation, Warren, Ohio, a corporation of Ohio Application August 2, 1951, Serial No. 239,914

9 Claims. (Cl. 219—4)

This invention relates to the art of electric resistance welding and more particularly to an improved device for controlling the flow of welding current in resistance welding apparatus of the type, for example, wherein a movable electrode is drawn laterally across strip stock to fasten the trailing end of one coil of strip to the leading end of a succeeding coil to thus form a continuous length of strip.

In apparatus of this character it is common practice to utilize a relatively wide platen or die which comprises the lower or fixed electrode upon which the ends of the strip stock are overlapped for the welding operation. A movable electrode, which comprises a wheel of highly conductive material is adapted to be rolled across the upper strip to thus enable the welding current to pass vertically through the overlapping strips to cause fusion thereof. It is, of course, desirable to employ in such apparatus automatic controlling means which is operative to begin and end the weld at or near the edge of the metal strip. Heretofore, however, it has been extremely difficult to accomplish this in a practical manner without occasionally having the movable electrode move onto the die while still conducting current. It is accordingly the primary object of this invention to provide a novel means of controlling the flow of welding current in apparatus as described which is operative to begin and end welds at or very near the edge of the strip and which is operative at the same time to substantially preclude the possibility of damaging the side edges of the strip or of short circuiting the apparatus by permitting current flow while the movable electrode is in contact with the die member.

More specifically it is an object of this invention to utilize a novel arrangement wherein a controlling member is adapted to move laterally along with the movable electrode and is adapted, upon physical movement in response to contact with the strip, to control the flow of welding current. It is, of course, understood that the strip stock to be welded is often very thin, and for this reason prior attempts to utilize physical movement of the controlling member have, of necessity, incorporated a very sensitive arrangement for detecting the edge of the strip. Also, the presence of foreign particles, such as dirt or weld flash, for example, in the path of the sensitive controlling member is likely to cause improper firing of apparatus utilizing such control. As will become apparent upon consideration of the following disclosure the novel arrangement of the present invention utilizes a simple mechanical movement in such a manner as to eliminate the need for sensitive detection of the stock.

It is another object of the present invention to provide a novel means of controlling the flow of welding current as described in which all electrical contacts are totally enclosed to thus prevent weld flash and other foreign matter from causing improper firing of the apparatus. In certain prior control arrangements a detecting member moves laterally with the movable electrode and receives a low voltage electrical signal directly from the strip stock. As is often the case, however, the stock has a dirt and/or oxide coating which interferes with the passage of the signal to the detecting member and thus renders the operation of the apparatus somewhat unpredictable. By utilizing an operative mechanical detecting means coupled with enclosed electrical controls we have substantially eliminated the various short-comings of th prior art as will become apparent.

A further object of the invention is the provision of means operative upon downward movement of the vertical electrode into welding position to properly position the detecting member of our invention regardless of the welding pressure applied or variations in the size of the said electrode caused by wear.

The above and other objects and advantages of the invention will become apparent upon full consideration of the following detailed specification and accompanying drawings wherein is disclosed a certain preferred embodiment of the invention.

In the drawing:

Figures 3 through 5 are enlarged fragmentary views of the apparatus and control of Figure 1 showing the principal phases of a normal welding cycle; and Figure 6 is a simplified schematic diagram of the electrical circuit utilized in cooperation with the control device of our invention.

Figure 1:
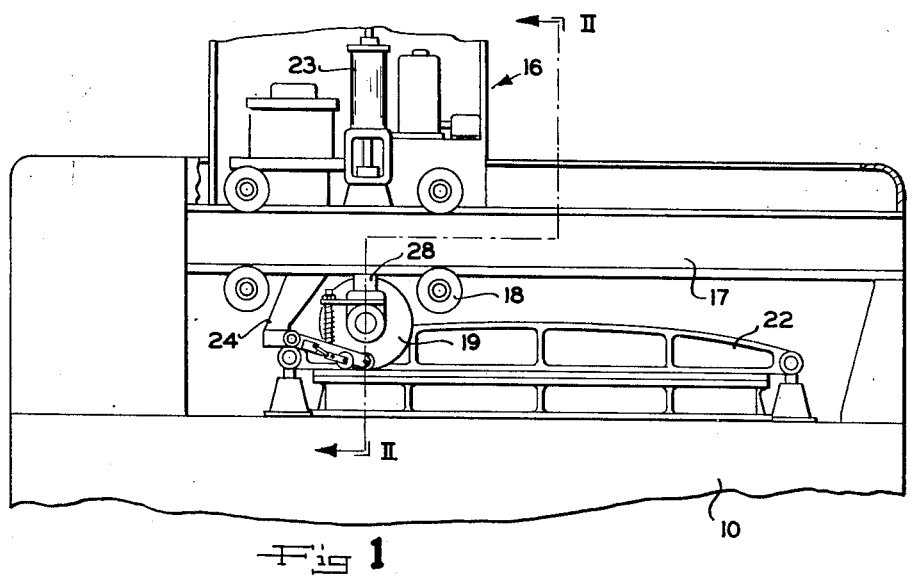
Figure 1 is a fragmentary front elevation of an electric resistance welding machine of the type adapted to weld strip stock and having control means constructed according to the principles of the invention.

In the embodiment of the invention herein disclosed the welding apparatus comprises a base member 10 upon which is secured a platen or die 11 which serves as the fixed electrode upon which strips 12 and 13 are placed. Plates 14 and 15 of suitable insulating material are positioned on each side of the die 11 to provide a flat even supporting surface. A carriage 16 is mounted on guide rails 17 by means of wheels 18 and is adapted to move horizontally therealong in parallel relation to the die 11. Rotatably mounted on the carriage 16 is a pair of axially spaced electrode wheels 19 which are adapted to be moved vertically into and out of contact with the die 11 and to be rolled horizontally along the top surface thereof in a well known manner.

Figure 2:
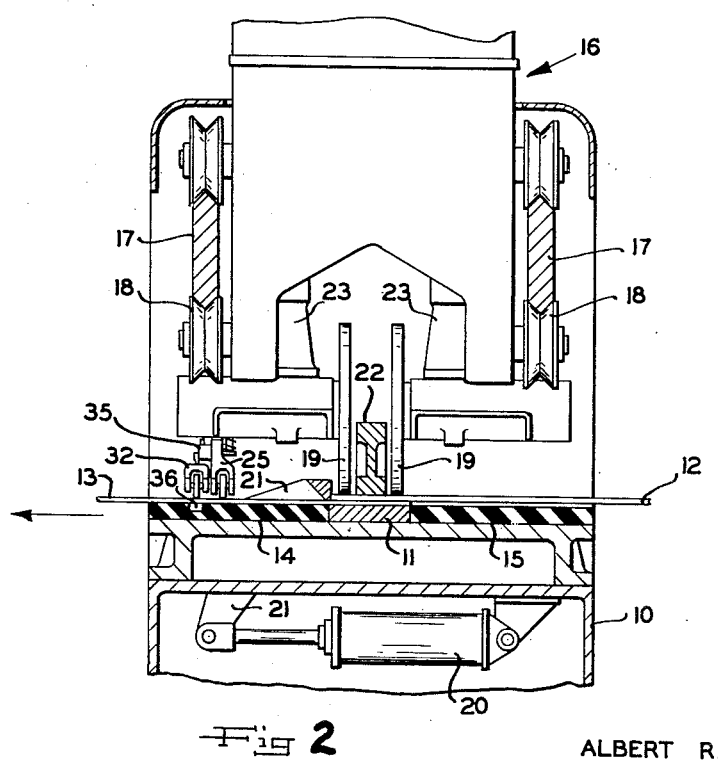
Figure 2 is a fragmentary cross section taken along line II—II of Figure 1, again showing the general arrangement of our control means as applied to strip welding apparatus.

In a normal welding operation a strip 13, moving from right to left as viewed in Figure 2, is stopped with its trailing edge positioned generally at the right hand edge of the die 11. A cylinder 20 is then actuated to operate a clamp and stop bar member 21, which functions to clamp the strip 13 and to provide a limit stop for the inwardly moving strip 12 as shown. A second clamping member 22 is then actuated to firmly clamp the overlapping strips 12 and 13 together and to provide good electrical contact between the lower strip 13 and the die member 11. At this point the carriage 16 is positioned to the right on the guide rails 17 with the electrode wheels 19 in the raised or retracted position as shown in Figure 5. To begin the weld, cylinders 23 are actuated to lower the electrode wheels to the die 11 and to thereafter maintain a predetermined welding pressure on the work. As the carriage 16 then begins to move toward the left the electrode wheels 19 roll along the surface of the die 11, up onto the upper strip 12, across the strip and onto the die at the left hand side to complete the traverse. As explained it is desirable to begin the weld as soon as the electrode wheels have rolled onto the strip 12 and to end the weld as the wheels come to the opposite edge of the strip. The present invention provides a practical and operative means of accomplishing this as will be disclosed.

Rigidly secured to the carriage 16 and depending downwardly therefrom is a mounting bracket 24 which is positioned axially outward of one of the electrode wheels 19 and to the left thereof. Pivotally mounted to the said bracket 24 at its lower end is a carrier arm 25 which carries at its outer end a positioning roller 26. As may be observed from Figures 3-5 the carrier arm 25 is adapted to swing through a relatively small arc and is of such length that the positioning roller 26 is at all times in substantial vertical alignment with the axis of the electrode wheels 19. To provide coaction between the carrier arm 25 and the electrodes 19 we provide a rigid bar 27 which is secured to the electrode carrier 28 and extends outwardly therefrom. A rod 29 is pivotally attached to the carrier arm 25 as shown and extends upwardly therefrom and through a suitable aperture in the bar 27. The upper end of the rod 29 carries a nut 30 to limit the downward movement of the arm 25 with respect to the bar 27, while a compressible coil spring 31 yieldably retains the said arm in its lowermost position. As should be apparent the arrangement is such that upon lowering of the electrode wheels 19 the carrier arm 25 will also be lowered until the positioning wheel 26 contacts the insulating plate 14. As the wheels 19 become smaller through wear etc., the spring 31 merely compresses to provide the necessary compensation.

The strip detecting member of our control device comprises an arm 32 which is pivotally attached to the carrier 25 and which retains at its outer end a following roller 33. The inner end of the detecting arm 32 is provided with a slot which is adapted to slidably receive the end of an actuator 34 of a conventional limit switch 35. As may be understood the limit switch 35 is of the normally open type and its actuator 34 is yieldably biased upwardly to thus tend to retain the detecting arm in the downward position as shown in Figure 3.

As explained, one of the principal difficulties with prior detecting devices of mechanical nature was caused by the fact that the strip is often very thin and consequently correspondingly sensitive detection was necessary. Our invention eliminates this objection entirely by providing a groove 36 in the insulating plate 14 in which the following wheel 33 may normally travel. Observe from Figures 3 and 4 that by thus using the groove 36, contact with even the thinnest of strip 13 will cause substantial movement of the following roller 33 and detecting arm 32 to provide positive actuation of the limit switch 35.

Since it is necessary that the following roller 33 be of reasonable size in order to properly roll onto the edge of the strip 13 it is desirable that the said roller 33 be positioned slightly ahead of the electrode wheels 19 to permit it to drop off the strip and into the groove 36 as the electrodes 19 come to the left hand edge of the strip. Thus, to prevent premature firing of the apparatus as the roller 33 makes initial contact with the strip we utilize a time delay solenoid relay 37 or other equivalent device to delay firing until the electrodes have moved onto the strip. It is, of course, understood that suitable well known sequencing controls, not shown, may be provided in the control panel 38 to cause the electrodes to retract and the carriage to move to the right at the completion of a weld.

It should now be apparent that we have by our invention provided a novel device which accomplishes the objects initially set forth. Our device provides an extremely simple and substantially foolproof means of accurately controlling the firing of traveling electrode welders, for example, in such manner that the line of weld may be accurately and dependably related to the side edges of the work pieces and with a negligible possibility of interruption of the welding current flow in the line of weld.

We have utilized an elementary mechanical movement which eliminates the unpredictable characteristics of electrical detection, and have, by a novel combination of elements, eliminated the various shortcomings found in prior devices of this type wherein mechanical detection has been utilized. For example, by incorporating a pivotally mounted and yieldably retained carrier 25 to which the detecting arm 32 is attached we have provided that the said detecting arm be properly positioned with respect to the strip regardless of variations in the diameter of the electrode as caused by wear and repeated trimming. Furthermore, the welding pressure used, and the deformation caused thereby, if of no consequence since the coil spring 31 maintains a substantially constant but relatively slight pressure upon the carrier 25 at all times. The use of the carrier 25 further provides that the detecting elements be relatively light in weight and thus very responsive.

By providing a groove 36 in the strip-supporting insulated plate 14 we permit the following roller 33 to normally ride substantially below the surface of the plate 14. It may easily be understood that with this arrangement even the thinnest of strip material will cause a sufficient movement of the roller 33 and detecting arm 32 to insure actuation of the limit switch 35.

With our arrangement it is possible to obtain extremely accurate and dependable control while using simple and inexpensive components.

It will be understood, however, that the embodiment of our invention herein shown and specifically described is intended to be illustrative only as obvious alterations may be made in the structure thereof without departing from the spirit of the invention. Reference should therefore be had to the appended claims in determining the true scope of the invention.

We claim:

1. In a control device for a strip welder having a fixed elongated lower electrode and a movable wheel-type of upper electrode, a work supporting plate positioned in fixed relation to said fixed electrode, said supporting plate having a groove therein disposed in parallel relation to the traverse of said movable electrode, a mounting bracket positioned in horizontally fixed relation to said movable electrode, a carrier pivotally mounted on said bracket and having a roller at its outer end adapted to contact said supporting plate or work to be welded, yieldable means to retain said roller in said contact, a work detecting arm pivotally secured to said carrier and having at its outer end a following roller adapted to contact said work, said roller being adapted to move in said groove, below the surface of said supporting plate when not in contact with said work, biasing means operative to urge said roller into said groove, and a limit switch in mechanical communication with said detecting arm operative to initiate a welding cycle upon movement of said following roller out of said groove and onto said work, and to end said welding cycle upon movement of said roller off of said work and into the said groove.

2. Apparatus according to claim 1 further characterized by said following roller being positioned ahead of the point of contact of said movable electrode, with said work and time delay means operative to delay the flow of weld current after initiation of said welding cycle until said movable electrode is in contact with said work.

3. In a control device for a strip welder having a fixed elongated lower electrode and a movable wheel-type of upper electrode, a strip supporting plate positioned in fixed relation to said fixed electrode, said strip supporting plate having a groove therein disposed in parallel relation to the traverse of said movable electrode, a mounting bracket positioned in horizontally fixed relation to said movable electrode, carrier means pivotally supported by said mounting bracket and adapted to contact said supporting plate or strip to be welded, yieldable means operative to urge said carrier means into said contact, strip detecting means pivotally mounted on said carrier means, said detecting means adapted to move in said groove below the surface of said supporting plate when not in contact with said strip, and a limit switch in mechanical communication with said detecting means operative to initiate a welding cycle upon movement of said detecting means out of said groove and onto said strip, and to end said welding cycle upon movement of said detecting means off of said strip and into said groove.

4. In a control device for a strip welder having a fixed elongated lower electrode and a movable wheel-type of upper electrode, a strip supporting plate positioned in fixed relation to said fixed electrode, said strip supporting plate having a groove therein disposed in parallel relation to the traverse of said movable electrode, carrier means pivotally mounted for vertical movement with respect to said movable electrode, said carrier means adapted to contact said supporting plate or strip to be welded, strip detecting means mounted on said carrier means and adapted to move in said groove when not in contact with said strip, and a limit switch in communication with said detecting means operative to initiate a welding cycle upon movement of said strip detecting means out of said groove and onto said strip and to end said welding cycle upon movement of said detecting means off of said strip and into said groove.

5. In apparatus for controlling the flow of welding current through the electrodes of a travel head seam welder having a fixed elongated electrode and a wheel-type of electrode adapted to travel therealong and a support for said wheel-type of electrode having a carriage adapted to move parallel with said fixed electrode and a vertically movable journal on said carriage for mounting said wheel-type of electrode the combination of a flat support positioned adjacent said fixed electrode to support a piece of sheet stock to be welded and having therein a groove disposed parallel with the path of travel of said carriage and wheel-type of electrode, a downwardly inclined arm pivotally mounted at its upper end on said carriage and having a roller at its lower end adapted to engage said support and the work piece lying thereon, yieldable means interconnecting said journal and said arm to yieldably bias the latter downwardly upon downward movement of said journal and to raise said arm upon upward movement of said journal, a second arm pivotally mounted on the first mentioned arm in downwardly inclined relation, said second arm being adapted to swing in a plane offset but parallel to the plane of movement of the first mentioned arm, a roller carried by the lower end of said second arm and adapted to travel either in said groove or on a work piece lying on said support, and a switch carried by the first mentioned arm and adapted to be actuated by pivotal movement of said second arm relative to the first mentioned arm.

6. Apparatus according to claim 5 further including switching means to establish and interrupt the flow of welding current to said electrodes, and circuit means including a time delay device to actuate said switching means to establish said current flow a predetermined time after actuation of said switch by upward tilting movement of said second arm and to deactivate said switching means upon opposite actuation of said switch due to predetermined downward tilting movement of said second arm.

7. In apparatus for controlling the flow of welding current through the electrodes of a travel head seam welder having a flat support for metal strip to be welded and a movable head supporting a wheel-type of electrode adapted to traverse the metal strip lying on said support the combination of a vertically movable member carried by said head and having follower means at its lower end, said flat support having a recess in its upper surface extending parallel with the path of travel of said head and adapted to receive said follower means at points spaced laterally of said strip, the arrangement being such that upon said follower means engaging said strip said vertically movable member is moved upwardly and upon said follower means moving off said strip and into said recess said vertically movable member moves downwardly, and a control switch carried by said head for operation by vertical movement of said vertically movable member.

8. Apparatus according to claim 7 further characterized in that said switch is supported on said head by means comprising a downwardly inclined arm pivotally mounted on said head at its upper end and having follower means at its lower end adapted to engage alternatively the upper surface of said flat support and the upper surface of said strip, means biasing said arm in a downward direction, and said vertically movable member comprising an arm pivotally mounted on said first mentioned arm.

9. In apparatus for initiating and terminating a welding operation of a travel head type seam welder of the type having a flat support for strip to be welded and a movable welding head adapted to traverse said support to perform a welding operation on strip supported thereon, the combination of a vertically movable carrier member carried by said head and having follower means at its lower end adapted to engage said support or strip supported thereon, a strip detecting member movably carried by said carrier member and adapted to normally lie in a first plane offset in one direction from the surface plane of said support and movable from said first offset plane to a second plane offset from said surface plane in the other direction, said second offset plane comprising the surface of strip lying on said support, and means operative upon said detecting means moving from said first to said second offset plane to initiate a welding operation and upon moving from said second offset plane to said first offset plane to terminate said welding operation.

ALBERT R. GEISZLER.
LEROY R. CONKLIN.

REFERENCES CITED

The following references are of record in the file of this patent:

UNITED STATES PATENTS

| Number | Name | Date |
|---|---|---|
| 1,932,119 | Reed | Oct. 24, 1933 |
| 2,018,646 | Caputo | Oct. 22, 1935 |